US012689978B2

(12) United States Patent
Cariou et al.

(10) Patent No.: US 12,689,978 B2
(45) Date of Patent: Jul. 21, 2026

(54) ACCESS POINT CONFIGURED FOR MULTI-AP GROUP OPERATIONS USING RESTRICTED TARGET WAKE TIME (r-TWT) SERVICE PERIOD (SP)

(71) Applicant: Intel Corporation, Santa Clara, CA (US)

(72) Inventors: Laurent Cariou, Milizac (FR); Thomas J. Kenney, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/899,999

(22) Filed: Aug. 31, 2022

(65) Prior Publication Data
US 2022/0417847 A1 Dec. 29, 2022

(51) Int. Cl.
*H04W 74/08* (2024.01)
*H04W 52/02* (2009.01)
*H04W 72/1263* (2023.01)

(52) U.S. Cl.
CPC ... *H04W 52/0206* (2013.01); *H04W 72/1263* (2013.01); *H04W 74/08* (2013.01)

(58) Field of Classification Search
None
See application file for complete search history.

(56) References Cited

U.S. PATENT DOCUMENTS

| | | | | |
|---|---|---|---|---|
| 2023/0128915 A1* | 4/2023 | Kim | H04W 72/12 | |
| | | | 370/329 | |
| 2023/0164709 A1* | 5/2023 | Ajami | H04W 56/0015 | |
| | | | 370/350 | |
| 2023/0262770 A1* | 8/2023 | Xin | H04W 72/1268 | |
| | | | 370/336 | |
| 2023/0328654 A1* | 10/2023 | Shafin | H04W 52/0258 | |
| | | | 370/311 | |
| 2023/0413343 A1* | 12/2023 | Kim | H04W 74/085 | |
| 2024/0049316 A1* | 2/2024 | Ajami | H04W 52/0229 | |
| 2024/0251355 A1* | 7/2024 | Kim | H04W 74/06 | |
| 2024/0422674 A1* | 12/2024 | Ryu | H04W 40/244 | |

* cited by examiner

*Primary Examiner* — Iqbal Zaidi
*Assistant Examiner* — Andrew Shaji Kurian
(74) *Attorney, Agent, or Firm* — Schwegman Lundberg & Woessner, P.A.

(57) ABSTRACT

An access point (AP) configured for multi-AP operation within a group of two or more other APs of a multi-AP group including at least a second AP uses restricted target wake time (r-TWT) service periods (SPs) for coordinating communications within the multi-AP group. The AP may be configured to encode a management frame for transmission to stations (STA) associated with the AP. The management frame may include a r-TWT element that includes a r-TWT schedule for communicating within one or more r-TWT SPs. The APs of the multi-AP group and their associated STAs may be configured to end any transmission opportunities (TXOPs) before a start of the r-TWT SPs and initiate a time-aligned contention period for the r-TWT SPs.

15 Claims, 9 Drawing Sheets

BSS

| Message type | Protocol | Value | Transmission type | Relay indicator field | Use CMDU Reliable Multicast? | Description |
|---|---|---|---|---|---|---|
| Multi-AP Group Formation message | EHT Multi-AP group formation | 0xxxxx (TBD) | Reliable multicast | 1 | Yes | A message to notify the formation of an EHT Multi-AP group within the Multi-AP network and the designation of the Coordinator AP for this group. |

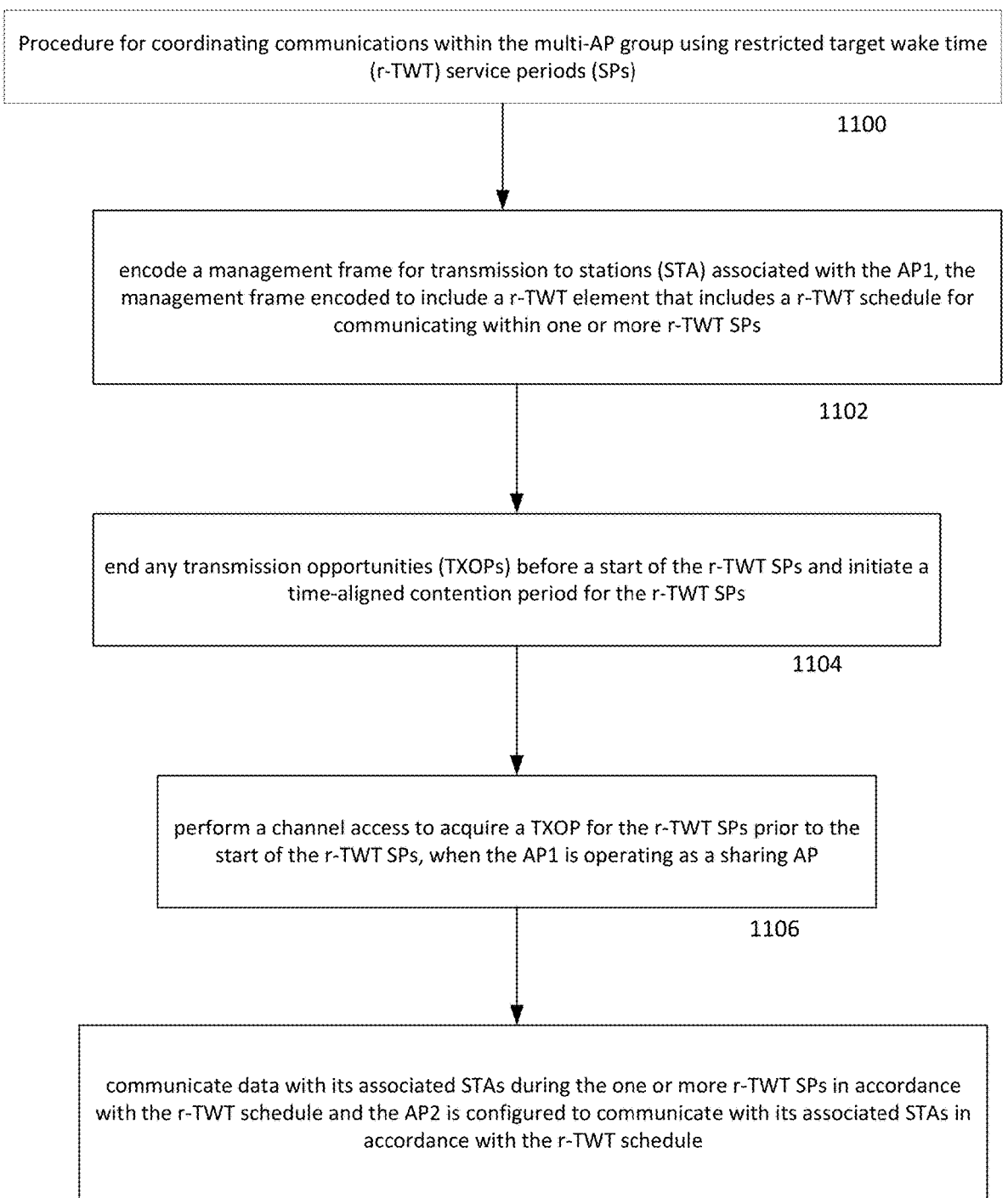

Procedure for coordinating communications within the multi-AP group using restricted target wake time (r-TWT) service periods (SPs)

1100 encode a management frame for transmission to stations (STA) associated with the AP1, the management frame encoded to include a r-TWT element that includes a r-TWT schedule for communicating within one or more r-TWT SPs

1102 end any transmission opportunities (TXOPs) before a start of the r-TWT SPs and initiate a time-aligned contention period for the r-TWT SPs

1104 perform a channel access to acquire a TXOP for the r-TWT SPs prior to the start of the r-TWT SPs, when the AP1 is operating as a sharing AP

1106 communicate data with its associated STAs during the one or more r-TWT SPs in accordance with the r-TWT schedule and the AP2 is configured to communicate with its associated STAs in accordance with the r-TWT schedule

ACCESS POINT CONFIGURED FOR MULTI-AP GROUP OPERATIONS USING RESTRICTED TARGET WAKE TIME (r-TWT) SERVICE PERIOD (SP)

TECHNICAL FIELD

Embodiments pertain to wireless communications. Some embodiments relate wireless local area networks (WLANs) that operate in accordance with the IEEE 802.11 standards. Some embodiments relate to IEEE 802.11be Extremely High Throughput (EHT) (i.e., the IEEE P802.11-Task Group BE EHT) (Wi-Fi 7).

BACKGROUND

One issue with communicating data over a wireless network is efficient utilization of channel resources. For Wi-Fi 8, an important technical topic is multi-access point (multi-AP) operation. One objective of multi-AP operation is to improve cooperation between APs to allow better coordination of users for more efficient utilization of resources (spatially, temporally and spectrally) thus improving overall system operation. Thus, what are needed are apparatus, systems and methods for improved multi-AP operation.

BRIEF DESCRIPTION OF THE DRAWINGS

FIG. 7 illustrates an EHT multi-AP group, in accordance with some embodiments.

FIG. 10 illustrates a multi-AP group formation message format, in accordance with some embodiments.

FIG. 11 illustrates a procedure 1100 for coordinating communications within the multi-AP group using restricted target wake time (r-TWT) service periods (SPs), in accordance with some embodiments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Some embodiments disclosed herein are directed to an access point (AP) configured for multi-AP operation within a group of two or more other APs of a multi-AP group including at least a second AP. The multi-AP group uses restricted target wake time (r-TWT) service periods (SPs) for coordinating communications within the multi-AP group. The AP may be configured to encode a management frame for transmission to stations (STA) associated with the AP. The management frame may include a r-TWT element that includes a r-TWT schedule for communicating within one or more r-TWT SPs. The APs of the multi-AP group and their associated STAs may be configured to end any transmission opportunities (TXOPs) before a start of the r-TWT SPs and initiate a time-aligned contention period for the r-TWT SPs.

Some embodiments disclosed herein are directed to a station (STA) configured for communicating with AP of a multi-AP group operations using restricted target wake time (r-TWT) service periods (SPs). These embodiments as well as others are described in more detail herein.

Figures 1, 2:
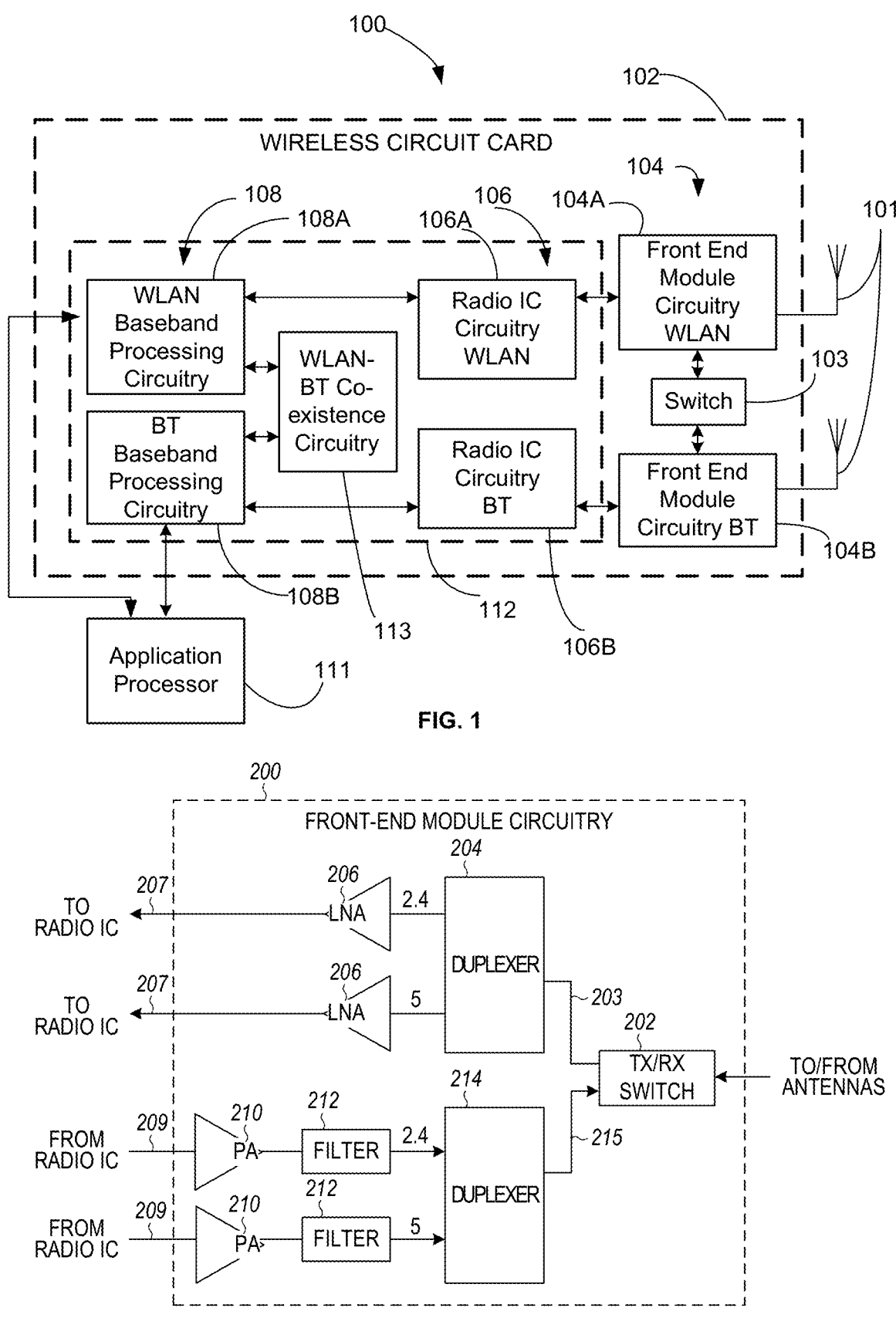
FIG. 1 is a block diagram of a radio architecture in accordance with some embodiments.
FIG. 2 illustrates a front-end module circuitry for use in the radio architecture of FIG. 1 in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, IEEE 802.11ax, and/or IEEE P802.11be standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In some embodiments, the radio architecture 100 may be configured for Extremely High Throughput (EHT) communications in accordance with the IEEE 802.11be standard. In these embodiments, the radio architecture 100 may be configured to communicate in accordance with an OFDMA technique, although the scope of the embodiments is not limited in this respect. In some embodiments, the radio architecture 100 may be configured for next generation vehicle-to-everything (NGV) communications in accordance with the IEEE 802.11bd standard and one or more stations including AP 502 may be next generation vehicle-to-everything (NGV) stations (STAs).

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards.

In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
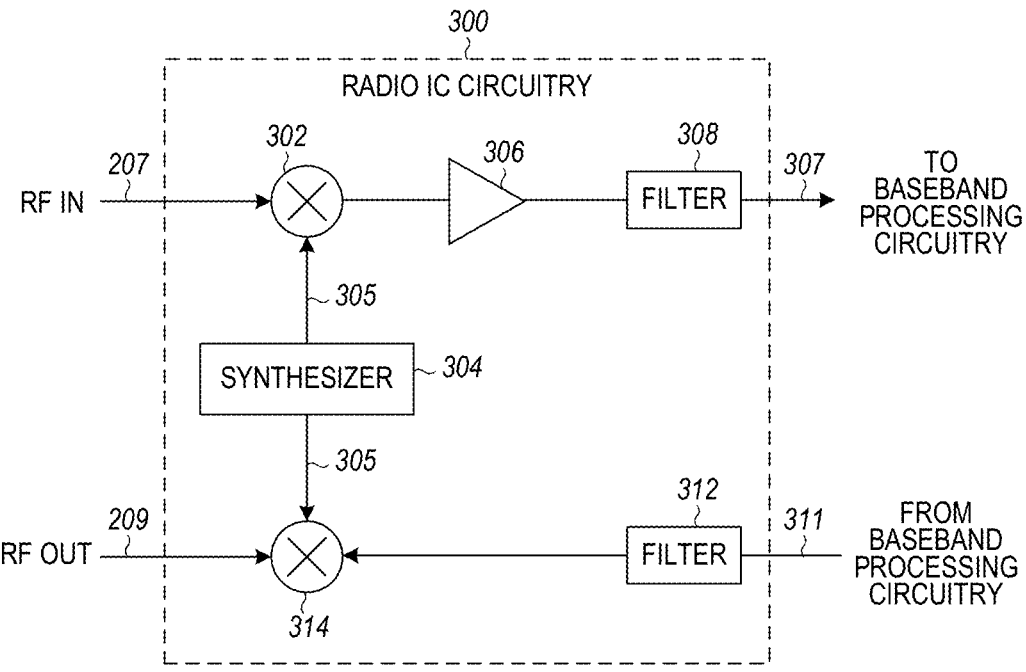
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
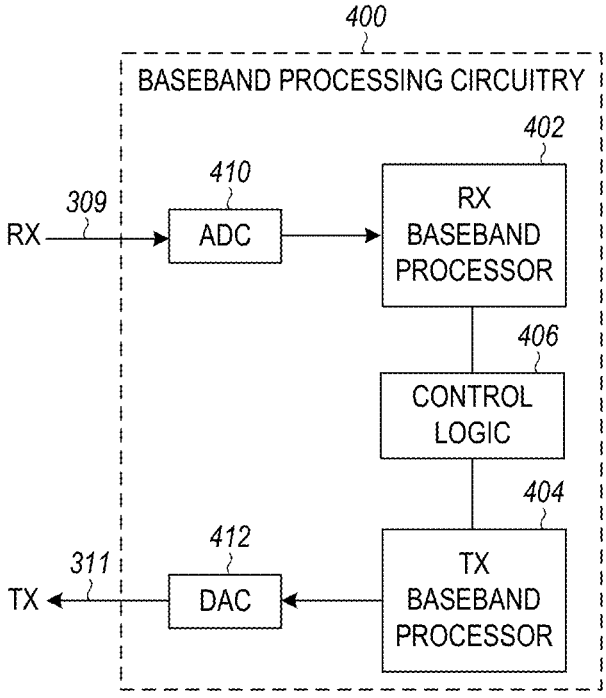
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
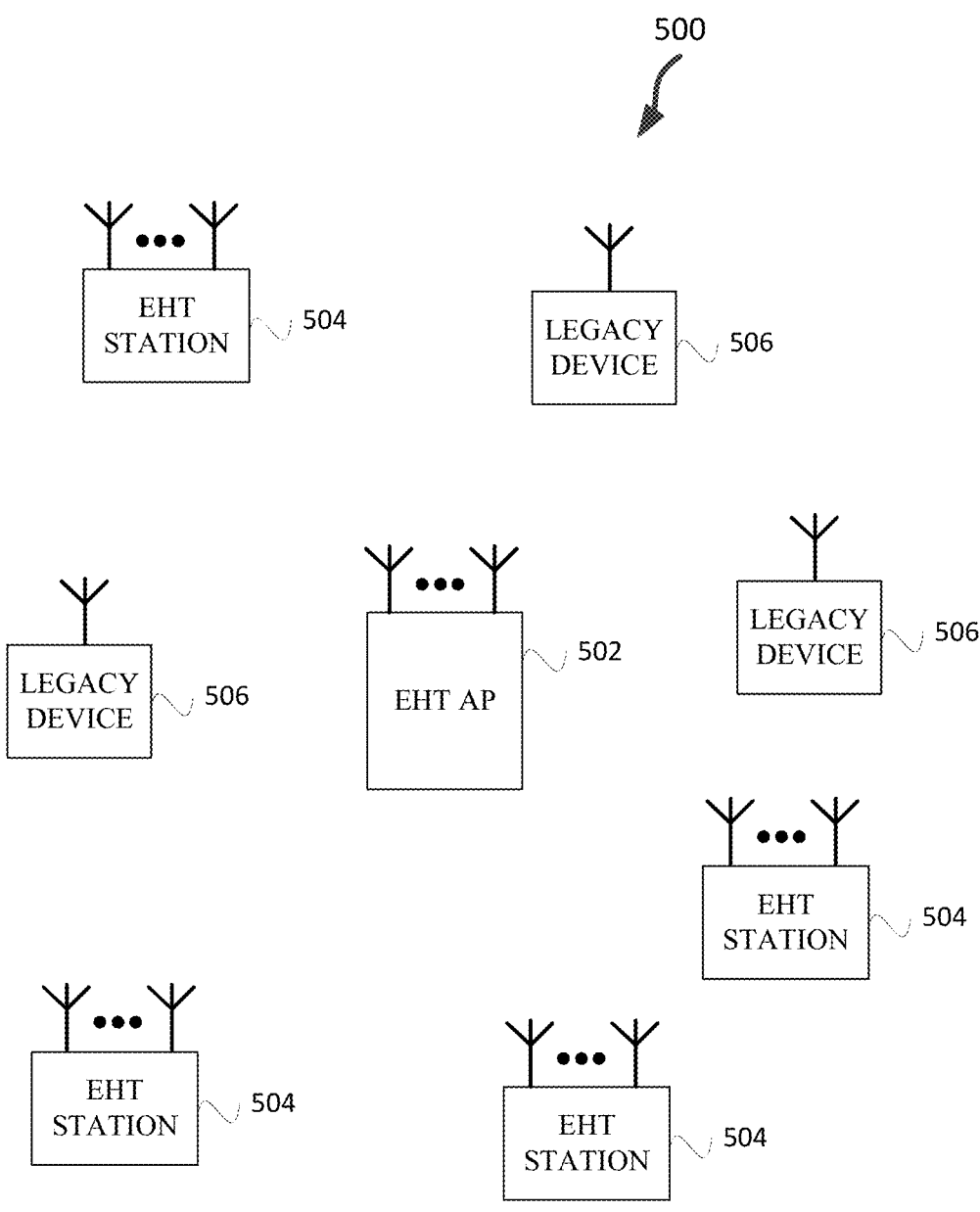
FIG. 5 illustrates a WLAN in accordance with some embodiments.

FIG. 5 illustrates a WLAN 500 in accordance with some embodiments. The WLAN 500 may comprise a basis service set (BSS) that may include an access point (AP) 502, which may be an AP, a plurality of stations 504, and a plurality of legacy (e.g., IEEE 802.11n/ac/ax) devices 506. In some embodiments, WLAN 500 may be configured for Extremely High Throughput (EHT) communications in accordance with the IEEE 802.11be standard and one or more stations including AP 502 may be EHT STAs. In some embodiments, WLAN 500 may be configured for next generation vehicle-to-everything (NGV) communications in accordance with the IEEE 802.11bd standard and one or more stations including AP 502 may be next generation vehicle-to-everything (NGV) stations (STAs).

The AP 502 may be an AP using the IEEE 802.11 to transmit and receive. The AP 502 may be a base station. The AP 502 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO). There may be more than one AP 502 that is part of an extended service set (ESS). A controller (not illustrated) may store information that is common to the more than one APs 502. IEEE P802.11be/D2.0, May 2022 is incorporated herein by reference.

The legacy devices 506 may operate in accordance with one or more of IEEE 802.11 a/b/g/n/ac/ad/af/ah/aj/ay, or another legacy wireless communication standard. The legacy devices 506 may be STAs or IEEE STAs. The STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol. In some embodiments, the STAs 504 may be termed high efficiency (HE) stations.

AP 502 may communicate with legacy devices 506 in accordance with legacy IEEE 802.11 communication techniques. In example embodiments, AP 502 may also be configured to communicate with STAs 504 in accordance with legacy IEEE 802.11 communication techniques.

In some embodiments, a frame may be configurable to have the same bandwidth as a channel. The frame may be a physical Layer Convergence Procedure (PLCP) Protocol Data Unit (PPDU). In some embodiments, there may be different types of PPDUs that may have different fields and different physical layers and/or different media access control (MAC) layers.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA PPDU formats. In some embodiments, the 106-subcarrier RU is used in the 20 MHz, 40 MHz, 80 MHz, 160 MHz and 80+80 MHz OFDMA and MU-MIMO PPDU formats. In some embodiments, the 242-subcarrier RU is used in the 40 MHz, 80 MHz, 160 MHz and 80+80 MHz OFDMA and MU-MIMO PPDU formats. In some embodiments, the 484-subcarrier RU is used in the 80 MHz, 160 MHz and 80+80 MHz OFDMA and MU-MIMO PPDU formats. In some embodiments, the 996-subcarrier RU is used in the 160 MHz and 80+80 MHz OFDMA and MU-MIMO PPDU formats.

A frame may be configured for transmitting a number of spatial streams, which may be in accordance with MU-MIMO and may be in accordance with OFDMA. In other embodiments, AP 502, STA 504, and/or legacy device 506 may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

Some embodiments relate to HE and/or EHT communications. In accordance with some IEEE 802.11 embodiments (e.g., IEEE 802.11ax embodiments) a AP 502 may operate as a master station which may be arranged to contend for a wireless medium (e.g., during a contention period) to receive exclusive control of the medium for an control period. In some embodiments, the control period may be termed a transmission opportunity (TXOP). AP 502 may transmit a master-sync transmission, which may be a trigger frame or control and schedule transmission, at the beginning of the control period. AP 502 may transmit a time duration of TXOP and sub-channel information. During the control period, STAs 504 may communicate with AP 502 in accordance with a non-contention based multiple access technique such as OFDMA or MU-MIMO. This is unlike conventional WLAN communications in which devices communicate in accordance with a contention-based communication technique, rather than a multiple access technique. During the control period, the AP 502 may communicate with STAs 504 using one or more frames. During the control period, the STAs 504 may operate on a sub-channel smaller than the operating range of the AP 502. During the control period, legacy stations refrain from communicating. The legacy stations may need to receive the communication from the AP 502 to defer from communicating.

In accordance with some embodiments, during TXOP the STAs 504 may contend for the wireless medium with the legacy devices 506 being excluded from contending for the wireless medium during the master-sync transmission. In some embodiments the trigger frame may indicate an uplink (UL) UL-MU-MIMO and/or UL OFDMA TXOP. In some embodiments, the trigger frame may include a DL UL-MU-MIMO and/or DL OFDMA with a schedule indicated in a preamble portion of trigger frame.

In some embodiments, the multiple-access technique used during the TXOP may be a scheduled OFDMA technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique. In some embodiments, the multiple access technique may be a Code division multiple access (CDMA).

The AP 502 may also communicate with legacy stations 506 and/or non-legacy stations 504 in accordance with legacy IEEE 802.11 communication techniques. In some embodiments, the AP 502 may also be configurable to communicate with STAs 504 outside the TXOP in accordance with legacy IEEE 802.11 communication techniques, although this is not a requirement.

In some embodiments station 504 may be a "group owner" (GO) for peer-to-peer modes of operation. A wireless device may be a Station 502 or a AP 502.

In some embodiments, the station 504 and/or AP 502 may be configured to operate in accordance with IEEE 802.11mc. In example embodiments, the radio architecture of FIG. 1 is configured to implement the station 504 and/or the AP 502. In example embodiments, the front-end module circuitry of FIG. 2 is configured to implement the station 504 and/or the AP 502. In example embodiments, the radio IC circuitry of FIG. 3 is configured to implement the station 504 and/or the AP 502. In example embodiments, the base-band processing circuitry of FIG. 4 is configured to implement the station 504 and/or the AP 502.

In example embodiments, the Stations 504, AP 502, an apparatus of the Stations 504, and/or an apparatus of the AP 502 may include one or more of the following: the radio architecture of FIG. 1, the front-end module circuitry of FIG. 2, the radio IC circuitry of FIG. 3, and/or the base-band processing circuitry of FIG. 4.

In example embodiments, the radio architecture of FIG. 1, the front-end module circuitry of FIG. 2, the radio IC circuitry of FIG. 3, and/or the base-band processing circuitry of FIG. 4 may be configured to perform the methods and operations/functions herein.

In example embodiments, the station 504 and/or the AP 502 are configured to perform the methods and operations/functions described herein. In example embodiments, an apparatus of the station 504 and/or an apparatus of the AP 502 are configured to perform the methods and functions described herein. The term Wi-Fi may refer to one or more of the IEEE 802.11 communication standards. AP and STA may refer to access point 502 and/or station 504 as well as legacy devices 506.

In some embodiments, a AP STA may refer to a AP 502 and a STAs 504 that is operating a APs 502. In some embodiments, when an STA 504 is not operating as a AP, it may be referred to as a non-AP STA or non-AP. In some embodiments, STA 504 may be referred to as either a AP STA or a non-AP.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 and IEEE P802.11be/D2.0, May 2022 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

Figure 6:
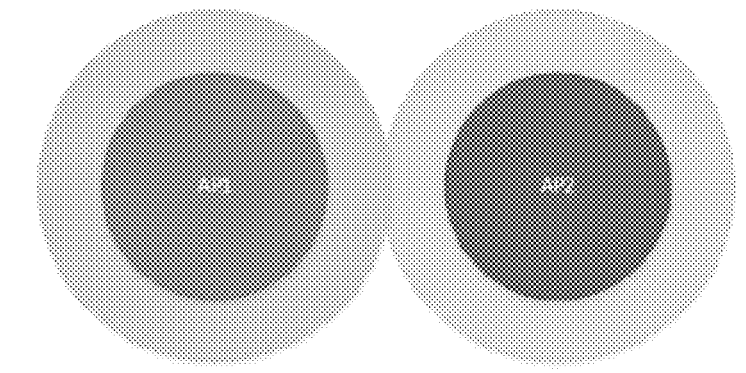
FIG. 6 illustrates multi-AP operation in which two or more access points (APs) communicate using restricted target wake time (r-TWT) service periods (SPs), in accordance with some embodiments.
Figure 6:
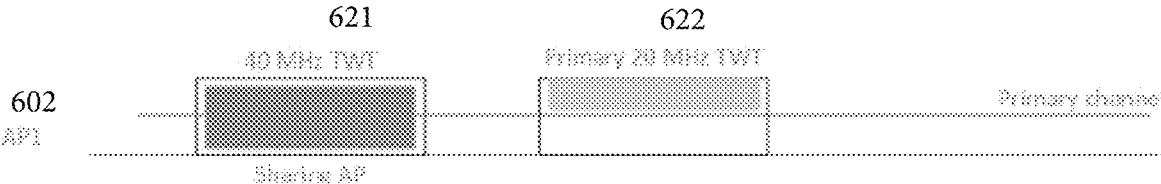
Figure 6:
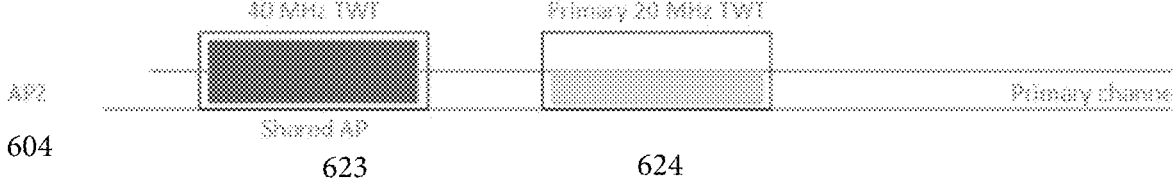

FIG. 6 illustrates multi-AP operation in which two or more access points (APs) communicate using restricted target wake time (r-TWT) service periods (SPs), in accordance with some embodiments.

For Wi-Fi 8, an important technical topic will be multi-AP operation. One objective of Multi-AP operation is to improve cooperation between APs that are in the same cooperation group. This allows better coordination of users, resources (spatially, temporally and spectrally) thus improving overall system operation. There are multiple methods to deploy Multi-AP operation that have been considered and continue to be under investigation:

Coordinated TDMA, where a sharing AP that gains a TXOP and accesses the medium will share its TXOP with other shared APs, splitting the TXOP in time into multiple allocations thus giving one time allocation to a shared AP (or to himself).

Coordinated OFDMA, where a sharing AP that gains a TXOP and accesses the medium will share its TXOP with other shared APs, splitting the TXOP in frequency into multiple allocations and giving one frequency allocation to a shared AP (or to himself), ensuring PPDU start and end time alignment to ensure no co-channel interference between the different frequency allocations.

Coordinated Spatial Reuse, where a sharing AP that gains a TXOP and accesses the medium will share its TXOP with other shared APs, splitting the TXOP in time into multiple allocations and giving one frequency allocation to multiple shared AP (or to himself) so that the medium is reused.

Coordinated Beamforming, and other more elaborated mechanisms.

All these modes rely on the definition of a Multi-AP trigger frame, which would be sent by the sharing AP to the shared APs, this would then assign the time or frequency allocations to the different shared APs and their associated STAs for the TXOP or for the allocation. The typical process will then be that all APs and STAs contend for the medium, and if a sharing AP gains access to the medium, and starts a TXOP, it can share it with the shared APs during the TXOP using the Multi-AP trigger frame. Once the TXOP ends, normal contention and operation as in previous generations would resume. The benefits of these solutions depend on the M-AP mechanism being used, where more system throughput gains are achieved with spatial reuse. One example is where 2 APs are coordinating, they can ensure that the STAs in the center of each BSS (and therefore relatively close for their serving AP and far from the other AP) can do spatial reuse during specific times, while STAs close to the BSS edge between the 2 APs (and therefore at equal distance between the 2 APs) can do frequency or time sharing of the medium during other times.

Gains can be shown, especially in a fully a managed environment where only APs are accessing the medium where it is relatively easy to have all APs in synch and available to share their resources. However, in realistic deployments where there is a lot of contention with STAs or other 3$^{rd}$ party APs in the same area, achieving gains are more difficult. Considering that last point, taking the case where 2 APs are operating on the same 40 MHz channel but each of them on a different primary channel. The reason for using different primary channels would be so they could fall back to 20 MHz only when the secondary channel is busy. unfortunately in that case, it is very likely that the 2 APs will end up being out of synch such that the contention periods on the 2 20 MHz channels never align, thus cancelling any chances to operate at 40 MHz or to have coordination between the 2 APs with a multi-AP scheme.

Embodiments disclosed herein use and modify a restricted TWT in order to help improve the performance of Multi-AP operation. The approach is that all APs in the AP candidate set (set of APs with APs being able to be sharing APs or shared APs) would advertise the same restricted TWT schedule or at a minimum some overlapping TWT SPs.

As the TWT element that describes the TWT SP and schedule is computed based on the TSF of the AP that sends the frame, the values in the TWT element sent by all the APs will be different, but they will point to the same service period (in time—basically the same start and end time).

Using this approach, all the STAs and the APs in the AP candidate set will have to end their TXOP (if they had one) before the start of the r-TWT SP and all the STAs and APs in the AP candidate set will start a contention period at the same time and will therefore all be fully aligned.

To enable this the approach is to use a value of 0 in the Broadcast TWT ID, in order to be able to have an r-TWT schedule that applies to all associated STAs. In addition the approach will add more information in the Broadcast TWT element in order to allow to define more specific parameters for operation within a Broadcast TWT service period, especially during an r-TWT service period.

Specifically, in some embodiments, a Channel Utilization or Channel BW field may be added to the Broadcast TWT parameter set field to be able to control the channels that are used by the AP and its member STAs during the r-TWT SP This new field would include the BW to use during the TWT SP, for instance 20. 40, 80, 160, 320 MHz The field can be a bitmap field with one bit for every 20 MHz channel of the total operating BW of the AP, and have each bit set to 1 if the 20 Mhz channel is used during the r-TWT SP This allows definition of an operating BW during an r-TWT SP which does not include a primary channel In addition this allows definition of an operating BW that is made of non-contiguous 20 MHz channels (puncturing)

This will allow 2 APs to define SPs during which both BSSs will operate with the same 40 MHz BW for the example shown in FIG. 1 below, and define other SPs during which each BSS will operate in its own and different primary 20 MHz channel In some embodiments, a field may be added to indicate if the AP sending the r-TWT element will be the one acting as the sharing AP during the TWT SP or as the shared AP.

If acting as a shared AP, that means that the AP will wait for the sharing AP to access the medium and send the trigger frame to share the medium with the shared AP. Thus the definition of specific rules on the client side in order to delay/pause its channel access from the start of the TWT SP until a defined point in time (time can be indicated in the TWT element or can be standardized or can be negotiated between the AP and STAs) is added.

These embodiments allow for the definition of a field to indicate the mode of Multi-AP that will be used during the r-TWT SP: C-TDMA, C-OFDMA, C-SR, . . . .

In addition, the definition of a field may be added to indicate whether the STAs are allowed to access the medium during the TWT SP or not.

Finally, definition of a field may be added to indicate whether the transmissions within the r-TWT are for DL only or for UL only, and for UL if they are triggered or not.

FIG. 6 illustrates the use of r-TWT to coordinate between two APs 602, 604. As shown in FIG. 6, one 40 MHz r-TWT may serve clients close to the AP that can use spatial reuse, and one 20 MHz r-TWT may be used serve clients far from the AP that do not use spatial reuse.

Some embodiments are directed to an access point (AP) (AP1) 602 configured for multi-AP operation within a group of two or more other APs of a multi-AP group including at least a second AP (AP2) 604. In these embodiments, for coordinating communications within the multi-AP group using restricted target wake time (r-TWT) service periods (SPs) 621, 622, 623 and 624, AP1 may be configured to encode a management frame for transmission to stations (STA) associated with the AP1. In these embodiments, the management frame may be encoded to include a r-TWT element that includes a r-TWT schedule for communicating within one or more r-TWT SPs.

In these embodiments, the APs of the multi-AP group and their associated STAs may be configured to end any transmission opportunities (TXOPs) before a start of the r-TWT SPs and initiate a time-aligned contention period for the r-TWT SPs (i.e., to align their contention periods thereby aligning their time-synchronization functions (TSFs) for communicating during the r-TWT SPs). In these embodiments, prior to the start of the r-TWT SPs, when the AP1 is operating as a sharing AP, the AP1 may be configured to perform a channel access (i.e., EDCA) to acquire a TXOP to acquire the medium for the r-TWT SPs. In these embodiments, during the one or more r-TWT SPs, the AP1 may be configured to communicate UL or DL data with its associated STAs in accordance with the r-TWT schedule and the AP2 may be configured to communicate with its associated STAs in accordance with the same r-TWT schedule.

In some embodiments, during the r-TWT SPs, time-synchronization functions (TSFs) of the APs and the STAs may be aligned.

In some embodiments, the r-TWT schedule includes a first r-TWT SP 621 during which the AP1 602 may be configured to communicate with its associated STAs concurrently with the AP2 604 communicating with its associated stations using a same channel (e.g., over a same 40 MHz channel). In some embodiments, the r-TWT schedule also includes a second r-TWT SP 622 during which the AP1 602 may be configured to communicate with its associated STAs concurrently with the AP2 604 communicating with its associated stations communicate over different channels (e.g., different 20 MHz channels).

In some embodiments, during the first r-TWT SP 621, the AP1 602 may be configured to communicate with its associated STAs concurrently with the AP2 604 communicating with its associated stations over channel comprising at least a first 20 MHz channel and a second 20 MHz channel (e.g., at least a 40 MHz channel). In these embodiments, during the second r-TWT SP 622, the AP1 602 may be configured to communicate with its associated STAs over the first 20 MHz channel concurrently with the AP2 604 communicating with its associated stations communicate the second 20

MHz channel. In these embodiments, the first 20 MHz channel is a primary channel for a first BSS (BSS1) that includes the AP1 and its associated STAs. In these embodiments, the second 20 MHz channel is a primary channel for a second BSS (BSS2) that includes the AP2 and its associated STAs. In these embodiments, the STAs associated with the AP1 may use spatial reuse when communicating over the 40 MHz channel during the r-TWT SP 621 and the STAs associated with the AP2 may also use spatial reuse when communicating over the 40 MHz channel during the r-TWT SP 623, although this is not a requirement.

In some embodiments, the management frame that includes the r-TWT element transmitted by the AP1 is encoded to indicate that the AP1 is the sharing AP and intends to share a TXOP acquired by the AP1 in accordance with the r-TWT schedule. In these embodiments, the AP2 may be configured to transmit a frame encoded to include a r-TWT element that includes the r-TWT schedule for communicating with its associated STAs within the one or more r-TWT SPs. The frame that includes the r-TWT element transmitted by the AP2 may be encoded to indicate that the AP2 is a shared AP that will be sharing the TXOP acquired by the AP2 in accordance with the r-TWT schedule. In these embodiments, all APs of the multi-AP group may advertise the same r-TWT schedule with one or more overlapping SPs. These embodiments allow two APs 602, 604 to define SPs 621, 623 during which both BSSs will operate with the same 40 MHz BW, for example (see FIG. 6) and define other SPs 622, 624 during which each BSS will operate in its own and different primary 20 MHz channel.

In some embodiments, in response to the r-TWT element, the AP2 and the STAs associated with the APs of the multi-AP group may be configured to refrain from contending for a TXOP for use during the r-TWT SPs, This allows the sharing AP (AP1) to acquire the medium without having to compete with other devices. In these embodiments, the other APs (i.e., the shared APs AP2) and the STAs associated with the APs of the multi-AP group may be configured to compute the r-TWT schedule based on a TSF of the sharing AP1 (i.e., the AP that sends the frame with the r-TWT element).

In some embodiments, prior to the start of the r-TWT SPs, when the AP1 is operating as the sharing AP, the AP1 may be configured to send a multi-AP trigger frame to share the acquired TXOP with the AP2 (i.e., the shared AP of the multi-AP group) to initiate the r-TWT SPs. In these embodiments, the r-TWT SP may be a multi-AP trigger-enabled TWT SP, although the scope of the embodiments is not limited in this respect.

In some embodiments, the r-TWT element that includes the r-TWT schedule for communicating within one or more r-TWT SPs may be encoded to include a broadcast TWT ID of zero to indicate that the r-TWT schedule is to apply to all STAs associated with the AP1, a field to indicate whether the AP that is sending the r-TWT element is operating as one of a sharing AP and a shared AP, and a channel bandwidth field to indicate a bandwidth for use during each of the one or more r-TWT SPs and indicating which BSS channels are to be used.

In some embodiments, when the AP1 may be configured to operate a shared AP and the AP2 may be configured to operate as the sharing AP, the AP1 may be configured to refrain from acquiring the TXOP for the r-TWT SP and wait for the AP2 to acquire a TXOP and share the TXOP with the AP1.

In some embodiments, prior to transmission of the management frame that includes a r-TWT schedule for communicating within one or more r-TWT SPs, the AP1 may be configured to determine (e.g., negotiate and/or coordinate) the r-TWT schedule with the other APs of the multi-AP group including determining which AP will be the sharing AP (i.e., the AP sharing the TXOP) and which APs will be the shared APs.

Some embodiments are directed to a non-Access Point Station (STA) configured for communicating with AP of a multi-AP group operations using restricted target wake time (r-TWT) service periods (SPs). In these embodiments, the STA may be associated with a first Access Point station (AP) (AP1) that is configured for multi-AP operation within a group of two or more other APs of a multi-AP group including at least a second AP (AP2). In these embodiments, the STA may be configured to decode a management frame received from the AP1. The management frame may include a restricted target wake time (r-TWT) element that includes a r-TWT schedule for communicating within one or more r-TWT service periods (SPs). In these embodiments, the STA may be configured to end any transmission opportunities (TXOPs) before a start of the r-TWT SPs and initiate a time-aligned contention period for the r-TWT SPs. In these embodiments, the STA may communicate data with the AP1 during the one or more r-TWT SPs in accordance with the r-TWT schedule. In these embodiments, during the one or more r-TWT SPs, the AP1 may be configured to communicate uplink (UL) and/or downlink (DL) data with its other associated STAs in accordance with the r-TWT schedule and the AP2 may be configured to communicate with its associated STAs in accordance with the r-TWT schedule.

In some embodiments, in response to receipt of the r-TWT element from the AP1, the STA may be configured to refrain from contending for a TXOP for use during the r-TWT SPs. This allows the sharing AP (i.e., AP1) to acquire the medium without having to compete with other devices.

In some embodiments, the AP1 and the AP2 of the multi-AP group and their associated STAs may be configured to end any TXOPs before a start of the r-TWT SPs to initiate the time-aligned contention period for the r-TWT SPs. In some embodiments, during the r-TWT SPs, time-synchronization functions (TSFs) of the APs and their associated STAs may be aligned.

Some embodiments are directed to a non-transitory computer-readable storage medium that stores instructions for execution by processing circuitry an access point configured for multi-AP group operations using restricted target wake time (r-TWT) service periods (SPs).

In some embodiments, the STAs (i.e., the AP STAs and the non-AP STAs) may be part of a multi-link device (MLD) configured for multi-link communication on a plurality of links. In these embodiments, the MLD comprises plurality of stations (STAs) and is a logical entity that includes a singly addressable instance of a medium access control (MAC) layer and a physical (PHY) layer of a link of the plurality of links.

Figure 7:
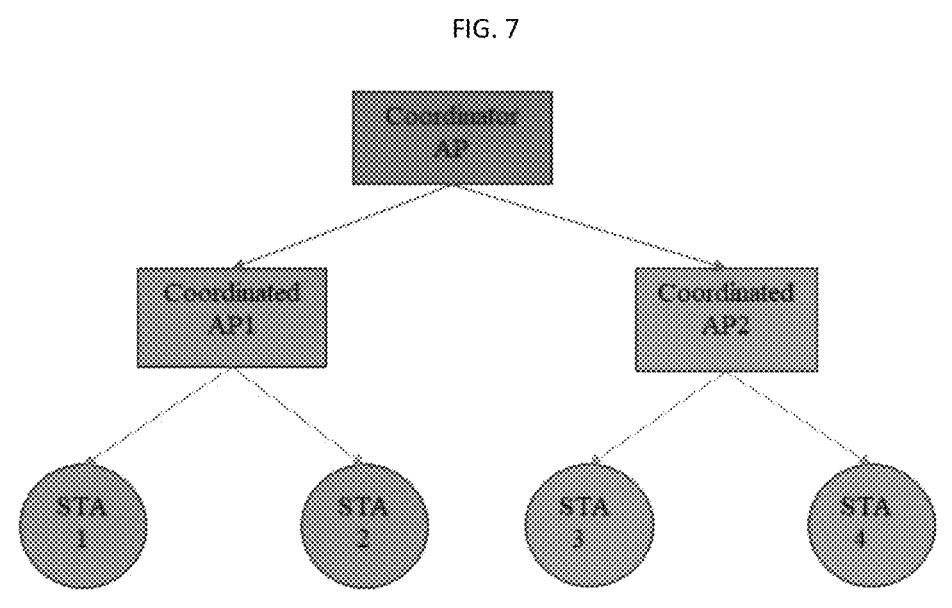

FIG. 7 illustrates an EHT multi-AP group in accordance with some embodiments. Multi-AP operation is one of the candidate features for EHT amendment. There have been many proposals on how to leverage the PHY/MAC level coordination among multiple APs to achieve better performance, including coordinated techniques such as coordinated scheduling, coordinated beamforming, and coordinated OFDMA, and joint techniques such as joint processing, distributed MIMO etc. All these techniques assume the basic structure of an EHT Multi-AP group as follows: One AP acts as the Master or Coordinator AP, which can reach to other APs. The Coordinator AP controls or coordinates the schedule and transmission among all APs in the group. One or more APs act as the Coordinated APs. These APs receive control or schedule information from the Coordinator AP, and executes operation instructed by the Coordinator AP.

Figure 8:
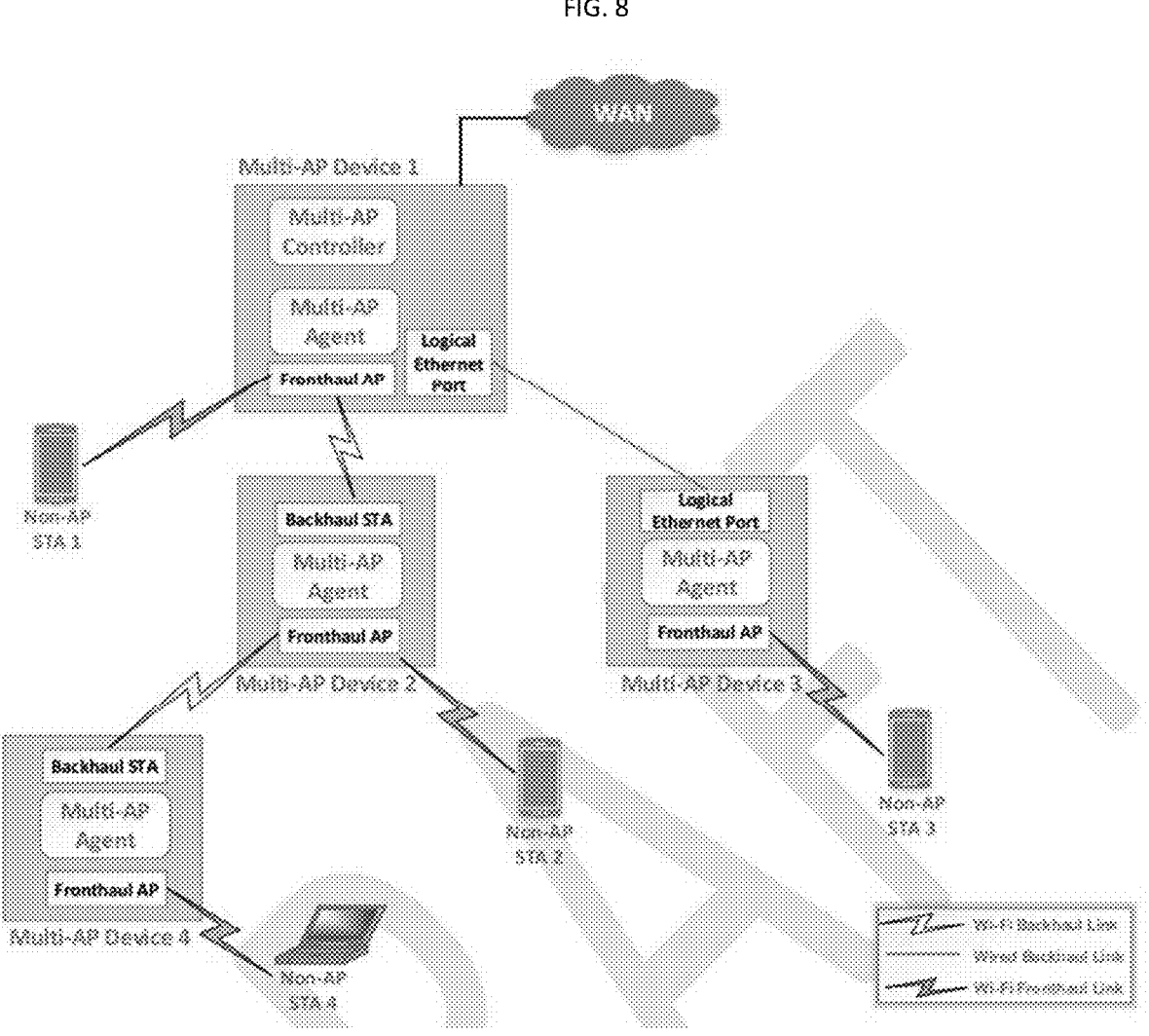
FIG. 8 illustrates a multi-AP network, in accordance with some embodiments.

FIG. 8 illustrates a Multi-AP network in accordance with some embodiments. All EHT Multi-AP contributions so far have only focused on how to leverage the coordination within a Multi-AP group, by automatically assuming a Multi-AP group already exists, and Coordinator & Coordinated APs are already determined. In accordance with embodiments disclosed herein, we propose the framework of EHT Multi-AP group formation from perspective. That is, define methods to enable EHT Multi-AP group formation within a Multi-AP network.

Figure 9:
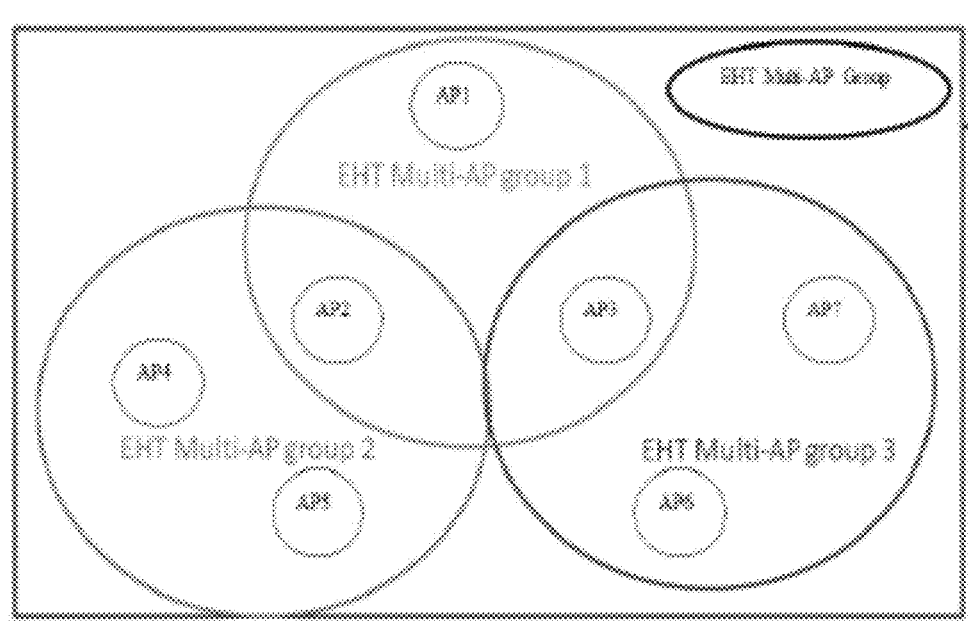
FIG. 9 illustrates forming multiple EHT multi-AP groups within a multi-AP network, in accordance with some embodiments.

FIG. 9 illustrates forming multiple EHT Multi-AP groups within a Multi-AP network in accordance with some embodiments. An EHT Multi-AP group can be defined a subset of Multi-AP network. Within a Multi-AP network, there can be multiple EHT Multi-AP groups. FIG. 9 shows an example of forming multiple EHT Multi-AP groups within a Multi-AP network. FIG. 10 illustrates a Multi-AP Group Formation message format in accordance with some embodiments.

FIG. 11 illustrates a procedure 1100 for coordinating communications within the multi-AP group using restricted target wake time (r-TWT) service periods (SPs). Procedure 1100 may be performed by an AP configured for multi-AP operation within a group of two or more other APs of a multi-AP group including at least a second AP (AP2).

In operation 1102, a management frame is encoded for transmission to stations (STA) associated with the AP1. The management frame may be encoded to include a r-TWT element that includes a r-TWT schedule for communicating within one or more r-TWT SPs.

In operation 1104, the APs of the multi-AP group and their associated STAs are configured to end any transmission opportunities (TXOPs) before a start of the r-TWT SPs and initiate a time-aligned contention period for the r-TWT SPs.

In operation 1106, the AP is configured to perform a channel access to acquire a TXOP for the r-TWT SPs prior to the start of the r-TWT SPs, when the AP1 is operating as a sharing AP.

In operation 1108, the AP1 may communicate data with its associated STAs during the one or more r-TWT SPs in accordance with the r-TWT schedule and the AP2 may communicate with its associated STAs in accordance with the r-TWT schedule.

In some embodiments, the mobile device (e.g., a STA) may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The antennas may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the mobile device is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point (AP) (AP1) configured for multi-AP operation within a group of APs of a multi-AP group including at least a second AP (AP2), the apparatus comprising: processing circuitry and memory, wherein for coordinating communications within the multi-AP group using restricted target wake time (r-TWT) service periods (SPs), the processing circuitry is configured to: encode a management frame for transmission to stations (STA) associated with the AP1, the management frame encoded to include a r-TWT element that includes a r-TWT schedule for communicating within one or more r-TWT SPs; wherein the APs of the multi-AP group and their associated STAs are configured to end any transmission opportunities (TXOPs) before a start of the r-TWT SPs and initiate a time-aligned contention period for the r-TWT SPs; wherein prior to the start of the r-TWT SPs, when the AP1 is operating as a sharing AP, the AP1 is configured to: perform a channel access to acquire a TXOP for the r-TWT SPs; and wherein during the one or more r-TWT SPs, the AP1 is configured to communicate data with its associated STAs in accordance with the r-TWT schedule and the AP2 is configured to communicate with its associated STAs in accordance with the r-TWT schedule, and wherein during the r-TWT SPs, time-synchronization functions (TSFs) of the APs and the STAs are aligned, wherein the group of APs of the multi-AP group are configured to operate as a multi-link device (MLD), the MLD being a logical entity using a singly addressable instance of a medium access control (MAC) layer and a physical (PHY) layer for communicating over a plurality of links with the STAs, wherein the management frame that includes the r-TWT element transmitted by the AP1 is encoded to indicate that the AP1 is the sharing AP and intends to share the TXOP acquired by the AP1 in accordance with the r-TWT schedule, and wherein the AP2 is configured to transmit a frame encoded to include a r-TWT element that includes the r-TWT schedule for communicating with associated STAs of the AP2 within the one or more r-TWT SPs, the frame that includes the r-TWT element transmitted by the AP2 being encoded to indicate that the AP2 is a shared AP that will be sharing the TXOP in accordance with the r-TWT schedule.

2. The apparatus of claim 1, wherein the r-TWT schedule includes: a first r-TWT SP during which the AP1 is configured to communicate with its associated STAs concurrently with the AP2 communicating with its associated stations using a same channel; and a second r-TWT SP during which the AP1 is configured to communicate with its associated STAs concurrently with the AP2 communicating with its associated stations communicate over different channels.

3. The apparatus of claim 2, wherein during the first r-TWT SP, the AP1 is configured to communicate with its associated STAs concurrently with the AP2 communicating with its associated stations over channel comprising at least a first 20 MHz channel and a second 20 MHz channel; and wherein during the second r-TWT SP, the AP1 is configured to communicate with its associated STAs over the first 20 MHz channel concurrently with the AP2 communicating with its associated stations communicate the second 20 MHz channel, wherein the first 20 MHz channel is a primary channel for a first BSS (BSS1) that includes the AP1 and its associated STAs, and wherein the second 20 MHz channel is a primary channel for a second BSS (BSS2) that includes the AP2 and its associated STAs.

4. The apparatus of claim 1, wherein in response to the r-TWT element, the AP2 and the STAs associated with the APs of the multi-AP group are configured to refrain from contending for a TXOP for use during the r-TWT SPs, and wherein other APs and the STAs associated with the APs of the multi-AP group are configured to compute the r-TWT schedule based on a TSF of the AP1.

5. The apparatus of claim 1, wherein prior to the start of the r-TWT SPs, when the AP1 is operating as the sharing AP, the AP1 is configured to: send a trigger frame to share the TXOP with the AP2 to initiate the r-TWT SPs.

6. The apparatus of claim 1 wherein the r-TWT element that includes the r-TWT schedule for communicating within one or more r-TWT SPs is encoded to include: a broadcast TWT ID to indicate that the r-TWT schedule is to apply to all STAs associated with the AP; a field to indicate whether the AP is operating as one of a sharing AP and a shared AP; and a channel bandwidth field to indicate a bandwidth for use during each of the one or more r-TWT SPs and indicating which channels are to be used.

7. The apparatus of claim 1, wherein when the AP1 is configured to operate a shared AP and the AP2 is configured to operate as the sharing AP, the processing circuitry is to configure the AP1 to refrain from acquiring the TXOP for an r-TWT SP and wait for the AP2 to acquire a TXOP and share the TXOP with the AP 1.

8. The apparatus of claim 1, wherein prior to transmission of the management frame that includes a r-TWT schedule for communicating within one or more r-TWT SPs, the AP1 is configured to determine the r-TWT schedule with other APs of the multi-AP group.

9. An apparatus of a non-Access Point Station (STA), the apparatus comprising: processing circuitry; and memory, wherein the STA is associated with a first Access Point station (AP) (AP1) that is configured for multi-AP operation within a group of two or more other APs of a multi-AP group including at least a second AP (AP2), wherein the processing circuitry is configured to: decode a management frame received from the AP1, the management frame including a restricted target wake time (r-TWT) element that includes a r-TWT schedule for communicating within one or more r-TWT service periods (r-TWT SPs); end any transmission opportunities (TXOPs) before a start of the r-TWT SPs and initiate a time-aligned contention period for the r-TWT SPs; communicate data with the AP1 during the one or more r-TWT SPs in accordance with the r-TST schedule, wherein during the one or more r-TWT SPs, the AP1 is configured to communicate data with its other associated STAs in accordance with the r-TWT schedule and the AP2 is configured to communicate with its associated STAs in accordance with the r-TWT schedule, and wherein during the r-TWT SPs, time-synchronization functions (TSFs) of the APs and their associated STAs are aligned, wherein the group of APs of the multi-AP group are configured to operate as a multi-link device (MLD), the MLD being a logical entity using a singly addressable instance of a medium access control (MAC) layer and a physical (PHY) layer for communicating over a plurality of links with the STAs, wherein the management frame that includes the r-TWT element transmitted by the AP1 is encoded to indicate that the AP1 is a sharing AP and intends to share a TXOP acquired by the AP1 in accordance with the r-TWT schedule, and wherein the AP2 is configured to transmit a frame encoded to include a r-TWT element that includes the r-TWT schedule for communicating with associated STAs of the AP2 within the one or more r-TWT SPs, the frame that includes the r-TWT element transmitted by the AP2 being encoded to indicate that the AP2 is a shared AP that will be sharing the TXOP in accordance with the r-TWT schedule.

10. The apparatus of claim 9, wherein in response to receipt of the r-TWT element from the AP1, the STA is configured to refrain from contending for a TXOP for use during the r-TWT SPs.

11. The apparatus of claim 10, wherein the AP 1 and the AP2 of the multi-AP group and their associated STAs are configured to end any TXOPs before a start of the r-TWT SPs to initiate the time-aligned contention period for the r-TWT SPs.

12. The apparatus of claim 11, wherein the r-TWT schedule includes: a first r-TWT SP during which the AP1 is configured to communicate with its associated STAs concurrently with the AP2 communicating with its associated stations using a same channel; and a second r-TWT SP during which the AP1 is configured to communicate with its associated STAs concurrently with the AP2 communicating with its associated stations communicate over different channels.

13. A non-transitory computer-readable storage medium that stores instructions for execution by processing circuitry of an access point (AP) (AP1) configured for multi-AP operation within a group of other APs of a multi-AP group including at least a second AP (AP2), wherein for coordinating communications within the multi-AP group using restricted target wake time (r-TWT) service periods (SPs), the processing circuitry is configured to: encode a management frame for transmission to stations (STA) associated with the AP1, the management frame encoded to include a r-TWT element that includes a r-TWT schedule for communicating within one or more r-TWT SPs; wherein the APs of the multi-AP group and their associated STAs are configured to end a ny transmission opportunities (TXOPs) before a start of the r-TWT SPs and initiate a time-aligned contention period for the r-TWT SPs; wherein prior to the start of the r-TWT SPs, when the AP1 is operating as a sharing AP, the AP1 is configured to: perform a channel access to acquire a TXOP for the r-TWT SPs; and wherein during the one or more r-TWT SPs, the AP1 is configured to communicate data with its associated STAs in accordance with the r-TWT schedule and the AP2 is configured to communicate with its associated STAs in accordance with the r-TWT schedule, and wherein during the r-TWT SPs, time-synchronization functions (TSFs) of the APs and the STAs are aligned, wherein the group of APs of the multi-AP group are configured to operate as a multi-link device (MLD), the MLD being a logical entity using a singly addressable instance of a medium access control (MAC) layer and a physical (PHY) layer for communicating over a plurality of links with the STAs, wherein the management frame that includes the r-TWT element transmitted by the AP1 is encoded to indicate that the AP1 is the sharing AP and intends to share the TXOP acquired by the AP1 in accordance with the r-TWT schedule, and wherein the AP2 is configured to transmit a frame encoded to include a r-TWT element that includes the r-TWT schedule for communicating with associated STAs of the AP2 within the one or more r-TWT SPs, the frame that includes the r-TWT element transmitted by the AP2 being encoded to indicate that the AP2 is a shared AP that will be sharing the TXOP in accordance with the r-TWT schedule.

14. The non-transitory computer-readable storage medium of claim 13, wherein the r-TWT schedule includes: a first r-TWT SP during which the AP1 is configured to communicate with its associated STAs concurrently with the AP2 communicating with its associated stations using a same channel; and a second r-TWT SP during which the AP1 is configured to communicate with its associated STAs concurrently with the AP2 communicating with its associated stations communicate over different channels.

15. The non-transitory computer-readable storage medium of claim 14, wherein during the first r-TWT SP, the AP1 is configured to communicate with its associated STAs concurrently with the AP2 communicating with its associated stations over channel comprising at least a first 20 MHz channel and a second 20 MHz channel; and wherein during the second r-TWT SP, the AP1 is configured to communicate with its associated STAs over the first 20 MHz channel concurrently with the AP2 communicating with its associated stations communicate the second 20 MHz channel, wherein the first 20 MHz channel is a primary channel for a first BSS (BSS1) that includes the AP1 and its associated STAs, and wherein the second 20 MHz channel is a primary channel for a second BSS (BSS2) that includes the AP2 and its associated STAs.

* * * * *